May 30, 1939.　　　H. F. REHG　　　2,160,282
ARM REST CONTAINER
Filed March 8, 1937　　　2 Sheets-Sheet 1

INVENTOR.
Hugo F. Rehg
BY M. Y. Charles
ATTORNEY.

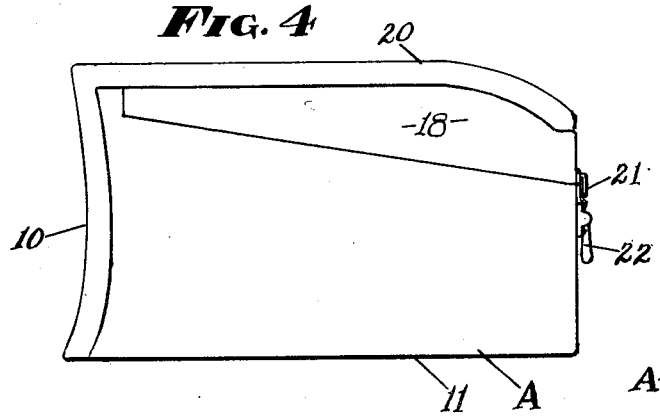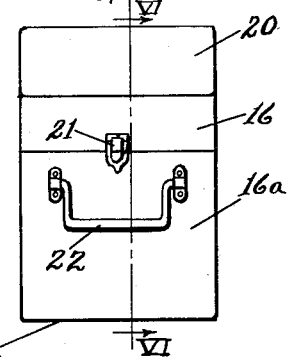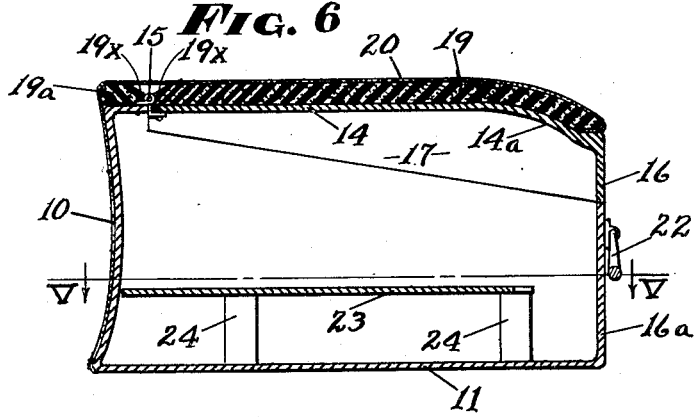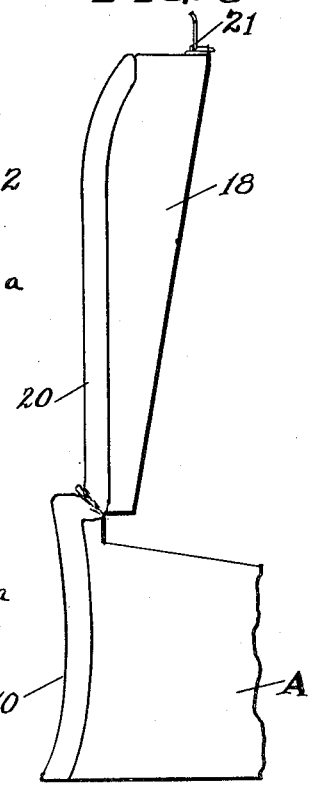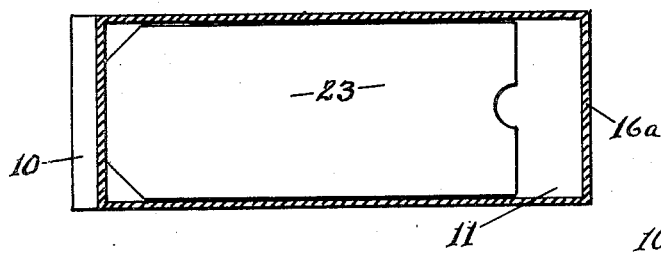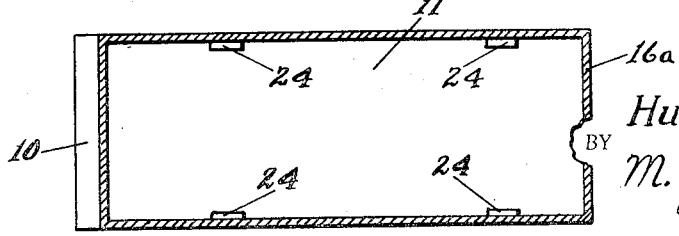

Patented May 30, 1939

2,160,282

UNITED STATES PATENT OFFICE 2,160,282

ARM REST CONTAINER

Hugo F. Rehg, Wichita, Kans.

Application March 8, 1937, Serial No. 129,590

1 Claim. (Cl. 155—112)

My invention relates to an improvement in arm rest containers.

The object of my invention is to provide a container that may be placed in the seat of a vehicle and the container being high enough that it will form a comfortable arm rest.

A further object is to provide a container of the kind mentioned, having a contour that will fit the curvature of the upholstering of the vehicle seat.

A further object is to provide a container of the kind mentioned, and having a removable shelf so as to allow comparatively heavy articles to be packed therein, and lighter articles packed therein will not be mashed by the heavier articles.

A still further object is to provide a container of the kind mentioned which can be readily picked up and carried.

These and other objects will be more fully described as this description progresses.

Figure 1:
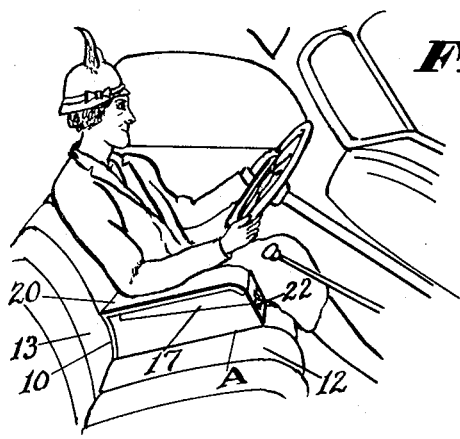
Figure 2:
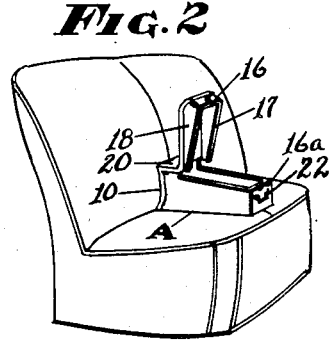
Figure 3:
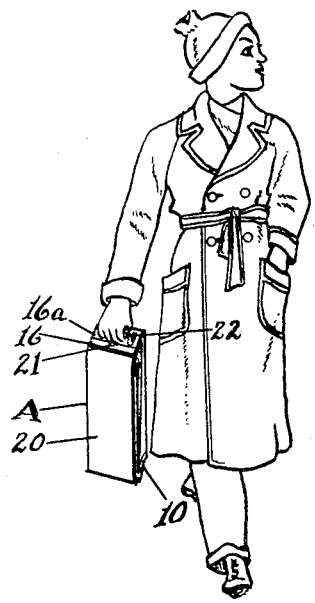

Now referring to the accompanying drawings, Fig. 1 is a view showing an automobile seat in which the container is positioned therein, for the purpose of an arm rest. Fig. 2 is a view of a vehicle seat, showing the container in a position similar to that in Fig. 1, the container being open so as to permit access to the contents. Fig. 3 is a view showing the container being carried as a canteen. Fig. 4 is a detail side view of the arm rest container. Fig. 5 is a front view of the arm rest container. Fig. 6 is a detail, longitudinal, sectional view, through the arm rest container, the view being taken along the line VI—VI in Fig. 5. Fig. 7 is a detail sectional view of the arm rest container, the view being taken along the line V—V in Fig. 6. Fig. 8 is a detail sectional view through the arm rest container, the view being taken along the line V—V in Fig. 6, and the shelf of the container being removed for convenience of illustration. Fig. 9 is a side detail view of the arm rest container, showing the cover in a raised position, so as to permit access to the container.

Similar numerals of reference designate the same parts throughout the several figures of the drawings.

In the drawings is shown the arm rest container which comprises a box like element, one end of which is curved, as at 10. This provides the container with a shape, such that the bottom 11 may be set on the cushion 12 of a vehicle seat, and the curve 10 will fit the curvature of the upholstering 13 on the back of the seat, so that there will be no space between the container and the back of the seat when the container is being used as an arm rest. The container is provided with a cover element 14, which is hingedly attached at 15 to the container so that the cover element 14 may be swung upwardly to a position shown in Figs. 2 and 9, so as to open the container. The cover element 14 is provided with a front wall 16, and the side walls 17 and 18. The cover portion 14 is provided with a soft pad preferably made of sponge rubber 19. At 19a is a continuation of the pad 19, the hinge 15 being positioned between the portions 19 and 19a of the pad. The adjacent edges of the portions 19 and 19a of the pad, are bevelled away from the hinge 15, as indicated at 19x so as to allow for the swing of the cover element.

The pad elements 19 and 19a are covered with an upholstering material 20, such as plush or mohair or the like, and this material also extends across the curved portion 10 of the container. The pads 19 and 19a are attached to the cover element and the box portion of the container, preferably by being cemented thereto, and the upholstering material 20 is attached to the cover and box portion, either by cementing or tacking thereto, as desired. At 21 is a hasp element, one half of which is on the wall 16 of the cover element, and the other half on the wall 16a of the box portion of the container, the hasp element being employed to lock the container in a closed position.

At 22 is a handle element attached to the wall 16a of the container, by which the container may be picked up and carried.

In the container is a shelf element 23 which is loosely supported on the upper ends of rib like elements 24 that are rigidly attached to the side walls of the container.

It is obvious that this construction permits the shelf 23 to be picked up and removed from the container box.

Attention is called to the fact that the cover portion 14, curves downwardly at the front end, as at 14a, so as to give a rounded finish to the arm rest and also avoids a sharp point at the outer end of the arm rest, which would be inclined to be uncomfortable and also would not be neat in appearance.

Due to the particular formation of the arm rest container, it would be possible to make it of a plastic material, such as hard rubber or fibrous material and the like that could be moulded, therefore the ribs 24 extend to the bottom 11 of the container so that a core or pattern could be easily removed from the box.

Such modifications may be employed as lie within the scope of the appended claim without departing from the spirit and intention of the invention. Now having fully described my invention, what I claim as new and desire to secure by Letters Patent is:

In an arm rest container, a box like element, said box like element having a top and cover portion, said cover portion being hinged to said top portion at a point spaced away from the end of said box, a cushion covering for said top and cover portions, said cushion portion being made in two pieces that have bevel edges at their joint at the point where the cover portion is hinged to the top portion so that the cover portion may be swung open without resistance from the cushion pieces, said cushion pieces being covered with upholstering material in such a manner as to conceal the hinges and bevelled joint between the two cushion pieces.

HUGO F. REHG.